(12) United States Patent
Liao et al.

(10) Patent No.: US 10,728,419 B2
(45) Date of Patent: Jul. 28, 2020

(54) SYSTEM AND METHOD USING MATRIX BARCODE INFORMATION TO PERFORM POINT-TO-POINT INFORMATION EXCHANGE

(71) Applicant: AVISION INC., Hsinchu (TW)

(72) Inventors: Chun-Cheih Liao, Hsinchu (TW);
Hung-Jen Lin, Hsinchu (TW);
Chun-Ping Huang, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 16/542,819

(22) Filed: Aug. 16, 2019

(65) Prior Publication Data
US 2020/0153997 A1    May 14, 2020

(30) Foreign Application Priority Data

Nov. 9, 2018   (TW) .............................. 107139777 A

(51) Int. Cl.
*H04N 1/327*       (2006.01)
*G06K 19/06*       (2006.01)
(Continued)

(52) U.S. Cl.
CPC ... *H04N 1/32778* (2013.01); *G06K 19/06037* (2013.01); *H04N 1/00214* (2013.01);
(Continued)

(58) Field of Classification Search
None
See application file for complete search history.

(56) References Cited

U.S. PATENT DOCUMENTS 6,915,327 B1 * 7/2005 Tuli ..................... H04L 67/2823
358/1.15
8,902,461 B2 * 12/2014 Oka ....................... G06F 3/1292
358/1.13
(Continued)

FOREIGN PATENT DOCUMENTS

TW        201411475 A      3/2014
TW        201638761 A     11/2016

*Primary Examiner* — Miya J Williams
(74) *Attorney, Agent, or Firm* — Schmeiser, Olsen & Watts, LLP

(57) ABSTRACT

A system and a method using matrix barcode information to perform point-to-point information exchange are provided. An electronic device is connected to a document-processing device by way of wired connection and instantly exchange information with a mobile device held by a user. The electronic device and the mobile device are wirelessly connected through matrix barcode information. The electronic device provides a file transfer zone for storing information to be transmitted. When the user transmits a remote command to the electronic device through the mobile device, the electronic device directly drives the document-processing device according to the remote command for the document-processing device to perform a corresponding automated document-processing action, such as scanning or printing. Given the instant information exchange scheme established based on the matrix barcode information, the document-processing efficiency can be enhanced.

20 Claims, 7 Drawing Sheets

(51) Int. Cl.
*H04N 1/00* (2006.01)
*G06Q 20/08* (2012.01)

(52) U.S. Cl.
CPC ..... *H04N 1/00244* (2013.01); *H04N 1/00307* (2013.01); *G06Q 20/085* (2013.01); *H04N 2201/0094* (2013.01)

(56) References Cited

U.S. PATENT DOCUMENTS

| | | | |
|---|---|---|---|
| 10,244,037 B2* | 3/2019 | Yagiura | H04L 67/10 |
| 2012/0224207 A1* | 9/2012 | Sueshige | G06F 3/1244 |
| | | | 358/1.13 |
| 2015/0060547 A1* | 3/2015 | Nagasawa | G06F 3/1292 |
| | | | 235/454 |
| 2015/0113061 A1* | 4/2015 | Nakamura | H04W 76/10 |
| | | | 709/204 |
| 2015/0264720 A1* | 9/2015 | Hino | H04W 12/04 |
| | | | 370/315 |
| 2016/0321373 A1 | 11/2016 | Chen et al. | |

* cited by examiner

SYSTEM AND METHOD USING MATRIX BARCODE INFORMATION TO PERFORM POINT-TO-POINT INFORMATION EXCHANGE

BACKGROUND OF THE INVENTION

1. Field of the Invention

The present invention relates to a system and a method for exchanging information of document-processing equipment and, more particularly to a system and a method using matrix barcode information to perform point-to-point information exchange.

2. Description of the Related Art

Lately, although rapid change and diversification of technologies stimulate the mushrooming growth in rollout and development of technological products, it's still commonplace for small and large-sized enterprises, public and private institutions to have a conventional document-processing equipment installed at premises thereof to process corresponding documents. The document-processing equipment may include a scanner, a printer or a multifunctional peripheral (MFP). By virtue of the document-processing equipment, the efficiency for document-processing tasks can be enhanced. Generally, the conventional document-processing equipment is connected to computer equipment through a connection line, allowing users to operate at the computer equipment and the document-processing equipment to perform corresponding document-processing tasks, for example, selecting a relevant document and printing out the selected document through the document-processing equipment or placing a paper document on the document-processing equipment for scanning and storing the scanned image in the computer equipment for users to review.

However, the conventional document-processing equipment is shared by multiple different users, and when users intend to download scanned image information of the document-processing equipment or print out other image information, a flash drive is additionally needed to connect with the computer equipment and store or print out corresponding image information. Such necessity is neither safe nor convenient because users must utilize the computer equipment to connect to the Internet first, then log in a cloud server with users' user names/passwords, and use the cloud server to store or download image information if the flash drive is not available. Given one example next for explanation, if one user intends to output one piece of documental information from a personal mobile device, such as mobile phone, tablet personal computer (PC), notebook computer, and the like, the user needs to first upload the piece of documental information to the cloud server, then operates the computer equipment to configure the document-processing equipment, and downloads the documental information from the cloud server for the computer equipment to drive the document-processing device to print out the piece of documental information. When another user intends to output another piece of documental information, the foregoing operations must be repeated again to establish the link with the cloud server, operate the computer equipment, and configure the document-processing equipment, which are inconvenient and time-consuming.

Furthermore, if a user intends to convert a document at hand into an image file and save the image file in the mobile device to facilitate the user's reading and carrying of the document, the user must also operate the computer equipment and configure the document-processing equipment. After the document-processing equipment is done with the scanning operation, the image file will then be stored in the computer equipment for the computer equipment to upload the image file to the cloud server. Then again, the user needs to log in the cloud server through the mobile device to download the image file from the cloud server. Similarly, the involved operation is also inconvenient and time-consuming. Therefore, regardless of printing or scanning operation, none of them is convenient. As can be seen from the foregoing description, despite the possibility of combining the document-processing equipment, the computer equipment, and the cloud server in the conventional techniques for meeting the common demands of most users, users should repeatedly undergo lengthy and inconvenient operation and configuration processes irrespective of input for printing and output for scanning.

SUMMARY OF THE INVENTION

An objective of the present invention is to provide a system and a method using matrix barcode information to perform point-to-point information exchange, which utilize matrix barcode information and wireless communication technique to establish an instant point-to-point information exchange scheme capable of effectively enhancing document-processing efficiency.

To achieve the foregoing objective, the system using matrix barcode information to perform point-to-point information exchange includes a document-processing device, an electronic device, and a mobile device.

The document-processing device has a first connection port.

The electronic device has a first application program and a second connection port.

The first application program is installed in the electronic device and generates matrix barcode information.

The second connection port is connected to the first connection port of the document-processing device.

The mobile device has a second application program installed in the mobile device and acquiring the matrix barcode information through the second application program to establish a wireless link with the electronic device.

When the mobile device establishes the wireless link with the electronic device, the first application program of the electronic device provides a file transfer zone to store information to be directly transmitted to the document-processing device and the mobile device in the file transfer zone, and when receiving a remote command sent from the mobile device, the electronic device transmits a driving command to the document-processing device according to the remote command to perform a corresponding automated document-processing action.

In view of the foregoing structure, when a user holds the mobile device to operate the electronic device, the user just needs to use the second application program in the mobile device to fetch the matrix barcode information generated by the first application program in the electronic device for establishing the wireless link between the electronic device and the mobile device. Besides, the electronic device stores the information to be directly transmitted to the document-processing device and the mobile device by way of point-to-point communication in the file transfer zone. When receiving the remote command sent from the mobile device, the electronic device instructs the document-processing device to perform a corresponding automated document-processing action according to the remote command. By virtue of the instant point-to-point information exchange scheme created by using the matrix barcode information, document-processing efficiency can be enhanced.

To achieve the foregoing objective, the method using matrix barcode information to perform point-to-point information exchange is performed by an electronic device, which is connected to a document-processing device and has a first application program installed therein and generating matrix barcode information. The method includes steps of:

providing matrix barcode information to establish a wireless link with a mobile device at a proximal end;

providing a file transfer zone;

receiving a remote command sent from the mobile device at the proximal end and transmitting a driving command corresponding to the remote command to directly drive the document-processing device to perform a document-scanning procedure; and directly transmitting a piece of image information for document acquired by performing the document-scanning procedure to the mobile device at the proximal end for storage.

Owing to the foregoing method, when a user's mobile device located at the proximal end intends to operate the electronic device and the document-processing device, the first application program of the electronic device generates the matrix barcode information, the electronic device establishes the wireless link with the mobile device by using the matrix barcode information and creates the file transfer zone. When receiving the remote command sent from the mobile device, the electronic device instructs the document-processing device to perform the document-scanning procedure to acquire the piece of image information for document, which is further transmitted to the mobile device at the proximal end from the file transfer zone in the electronic device. By virtue of the instant point-to-point information exchange scheme created by using the matrix barcode information, document-processing efficiency can be enhanced.

Other objectives, advantages and novel features of the invention will become more apparent from the following detailed description when taken in conjunction with the accompanying drawings.

DETAILED DESCRIPTION OF THE INVENTION

Figure 1:
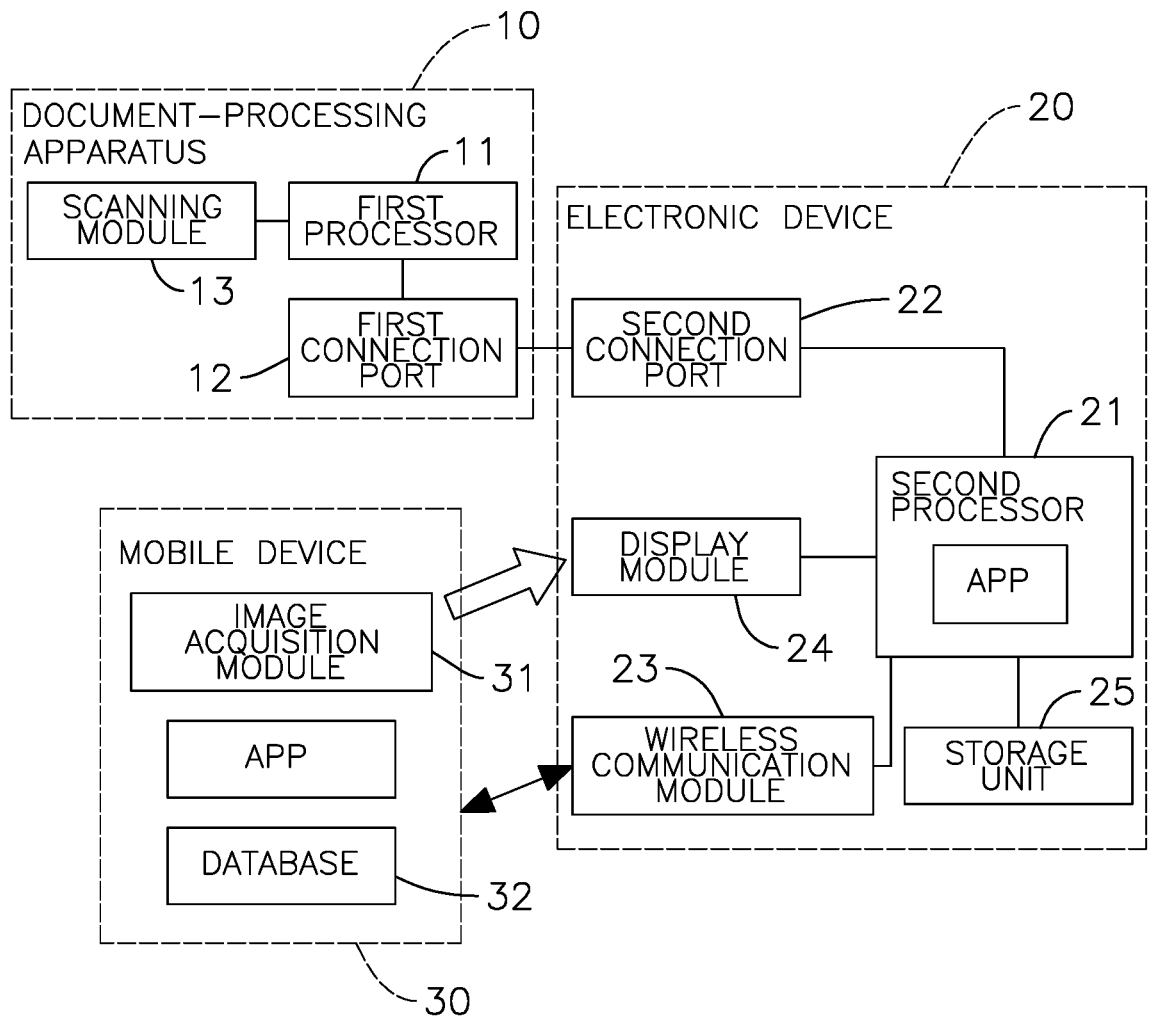
FIG. 1 is a functional block diagram of a first embodiment of a system using matrix barcode information to perform point-to-point information exchange having one type of system architecture in accordance with the present invention.

With reference to FIG. 1, a first embodiment of a system using matrix barcode information to perform point-to-point information exchange in accordance with the present invention includes a document-processing device 10, an electronic device 20, and a mobile device 30. The document-processing device 10 may be installed at a small or large-sized enterprise, a public institution, or a private institution and is shared by multiple users or is dedicated to one person at home only. It is noted that the document-processing device 10 is rather durable and has a low failure rate. When the document-processing device 10 pertains to an old type of conventional model, the document-processing device 10 is not equipped with a wireless communication module, thus failing to establish a link with the mobile device 30.

In the present invention, a user only needs to hold the mobile device 30 to control the electronic device 20, such that direct control over the electronic device 20 through the mobile device 30 can be conducted and the electronic device 20 can directly perform point-to-point exchange information with the document-processing device 10 and the mobile device 30. In the present embodiment, the mobile device 30 is one of a mobile phone, a tablet PC, a notebook computer and the like. The electronic device 20 is one of a desktop computer, a notebook computer and the like.

With further reference to FIG. 1, the document-processing device 10 includes a processor 11, a first connection port 12, and a scanning module 13. The first processor 11 is electrically connected to the first connection port 12 and the scanning module 13. The first connection port 12 serves to transmit a driving signal to the first processor 11 for the first processor 11 to drive the scanning module 13.

In the present embodiment, the electronic device 20 has a second processor 21, a second connection port 22, a wireless communication module 23, a display module 24, and a storage unit 25. The second processor 21 is electrically connected to the second connection port 22, the wireless communication module 23, the display module 24, and the storage unit 25, and has a first application program (APP) installed therein. The second connection port 22 is electrically connected to the first connection port 12 of the document-processing device 10. The second processor 21 of the electronic device 20 executes the first APP to generate matrix barcode information that is displayed through the display module 24.

Figure 2:
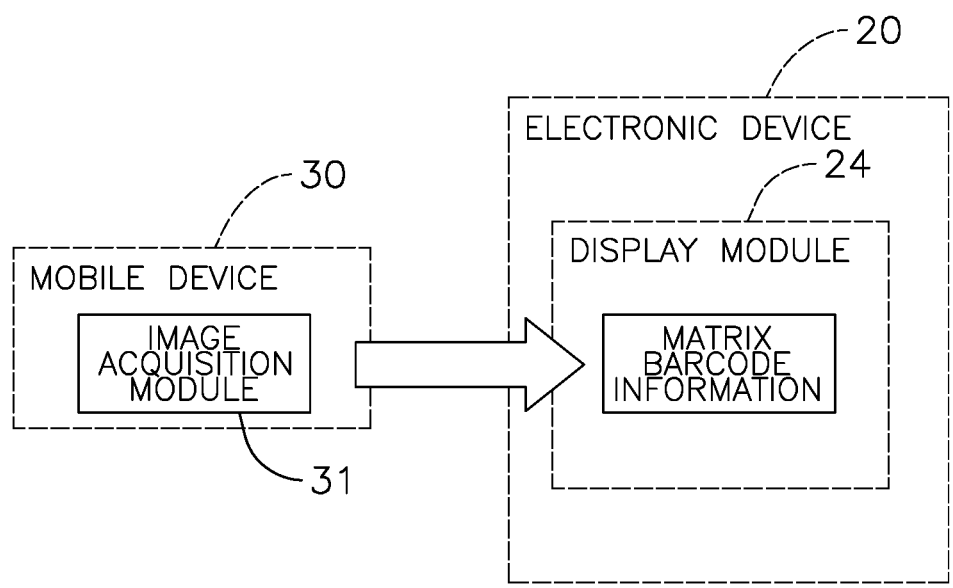
FIG. 2 is a partial operational functional block diagram of the system in FIG. 1.

Moreover, in the present embodiment, the mobile device 30 is connected to a network to download a second APP through the network. The second APP communicates with the first APP. The mobile device 30 further has an image acquisition module 31 and a database 32. With reference to FIGS. 1 and 2, when a user executes the second APP in the mobile device 30 to drive the image acquisition module 31 so as to acquire the matrix barcode information displayed on the display module 24 of the electronic device 20, the second APP in the mobile device 30 analyzes the acquired matrix barcode information to acquire dedicated connection information. In the present embodiment, the connection information includes account information, password information, address information and the like. The mobile device 30 transmits a wireless signal meeting a wireless protocol to the wireless communication module 23 of the electronic device 20 according to the connection information to establish a wireless link with the wireless communication module 23 of the electronic device 20.

The matrix barcode information in the present embodiment is constituted by a quick response code (QR code). Because of the inclusion of numbers, texts, symbols, byte and the like, the QR code may be used to constitute information, such as web address, text message, phone number, wireless log-in account/password, and the like. Owing to fast speed in encoding and decoding the matrix barcode information, high efficiency and enhanced operational convenience can be secured upon the use of the matrix barcode information.

When the mobile device 30 uses the matrix barcode information to establish the wireless link with the electronic device 20, the first APP in the electronic device 20 creates a file transfer zone in the storage unit 25 for directly transmitting between the electronic device 20 and each of the document-processing device 10 and the mobile device 30 in a way of point-to-point communication. When the wireless communication module 23 of the electronic device 20 receives a remote command sent from the mobile device 30, the first APP of the electronic device 20 allows the first processor 21 to transmit a driving signal corresponding to remote command to the first connection port 12 of the document-processing device 10 through the second connection port 22. The first connection port 12 of the document-processing device 10 further forwards the driving signal to the first processor 11 of the document-processing device 10 for the first processor 11 to drive the scanning module 13 to perform a corresponding automated document-processing action.

In the present embodiment, the automated document-processing action includes a document-scanning procedure which generates at least one piece of image information for document that is transmitted from the first connection port 12 of the electronic device 10 to the second connection port 22 of the electronic device 20, temporarily stores the at least one piece of image information for document in the file transfer zone, and instantly transmits the at least one piece of image information to the database 32 of the mobile device 30 via the wireless communication module 23 of the electronic device 20.

Figure 3:
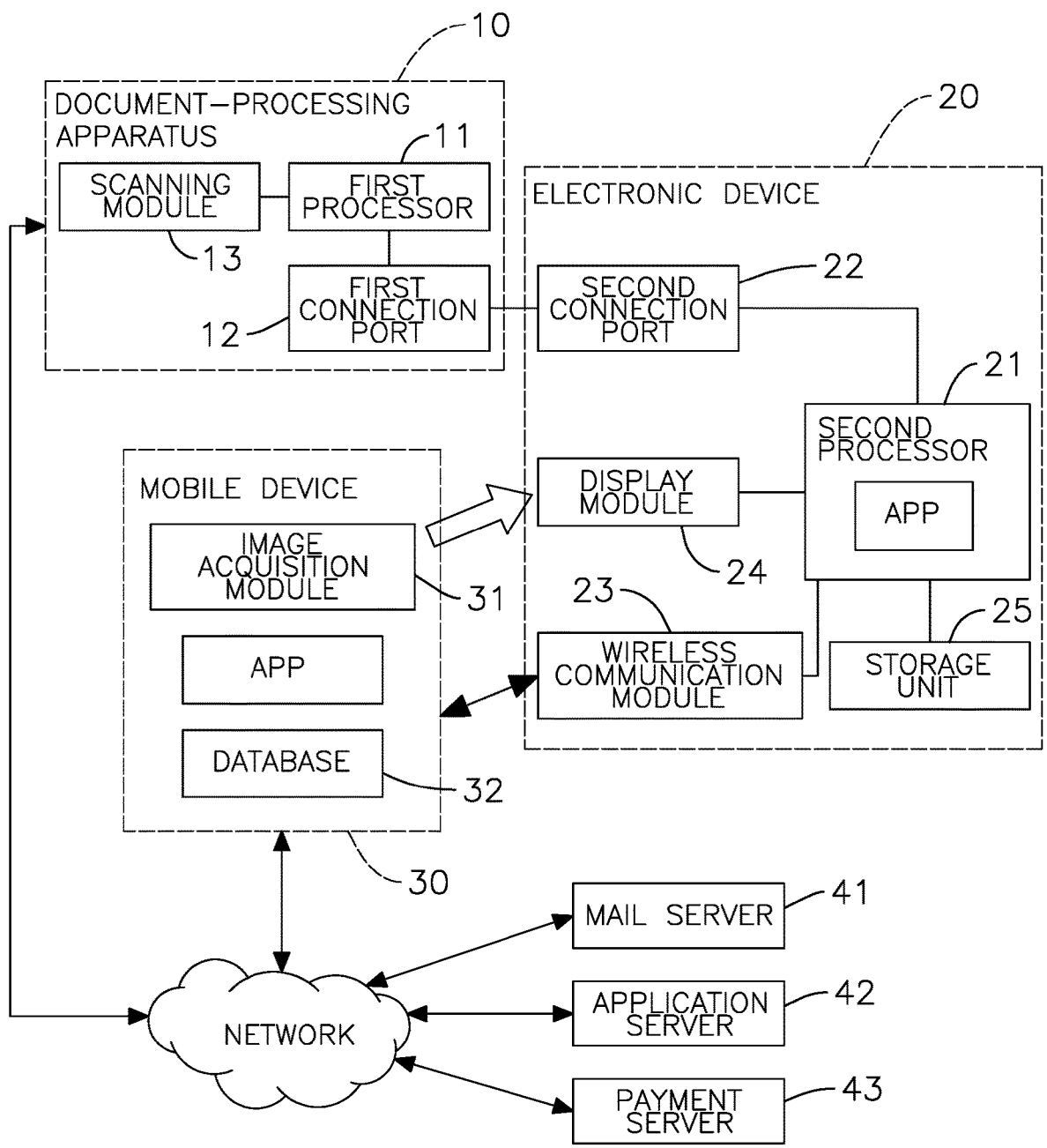
FIG. 3 is a functional block diagram of the system in FIG. 1 having another type of system architecture.

With reference to FIG. 3, compared with the system architecture in FIG. 1, the system using matrix barcode information to perform point-to-point information exchange additionally includes a mail server 41, an application server 42, and a payment server 43. The document-processing apparatus 10 is connected to the network by way of wired connection and is connected to the mail server 41, the application server 42 and the payment server 43 through the network. The user can configure a set of setting parameters and scheduling information in the mobile device 30 or the electronic device 20 beforehand. The set of setting parameters includes a quantity of document, a size of image, image rotation, image clipping, two-sided image, image quality and the like.

In the present embodiment, the scheduling information includes a mail-forwarding command, a cloud storage command, a classified storage command, or a payment command. After completing the automatic document-processing action, the document-processing apparatus 10 performs corresponding subsequent actions according to the scheduling information. When the scheduling information is the mail-forwarding command, the document-processing apparatus 10 directly transmits the at least one piece of image information for document that is directly generated to the mail server 41 or indirectly transfers the at least one piece of image information for document stored in the file transfer zone of the electronic device 20 to the mail server 41 through the network, such that the user can log in the mail server 41 to retrieve the at least one piece of image information for document and transfer the at least one piece of image information for document to other users for enhancement of users' operational convenience.

When the scheduling information is the cloud storage command, the document-processing apparatus 10 forwards the at least one piece of image information for document that is directly generated to the application server 42 for backup or transfers the at least one piece of image information for document that is indirectly stored in the file transfer zone of the electronic device 20 to the application server 42 through the network, such that the user can utilize the application server 42 to duplicate the at least one piece of image information for document or further transfer the at least one piece of image information for document to other users for enhancement of users' convenience in information management.

When the scheduling information is the classified storage command, the document-processing apparatus 10 stores the at least one piece of image information for document in a corresponding information directory in the file transfer zone of the electronic device 20 according to attributes or parameters of the at least one piece of image information for document or transfers the at least one piece of image information for document to the mobile device 30 through the electronic device 20 for the second APP of the mobile device 30 to store the at least one piece of image information for document in a corresponding information directory in the database 32 of the mobile device 30 according to the attributes or the parameters of the at least one piece of image information for document for further enhancement of convenience in information management.

When the scheduling information is the payment command, the document-processing apparatus 10 issues a payment request to the payment server 43 to complete a payment procedure through the payment server 43.

Figure 4:
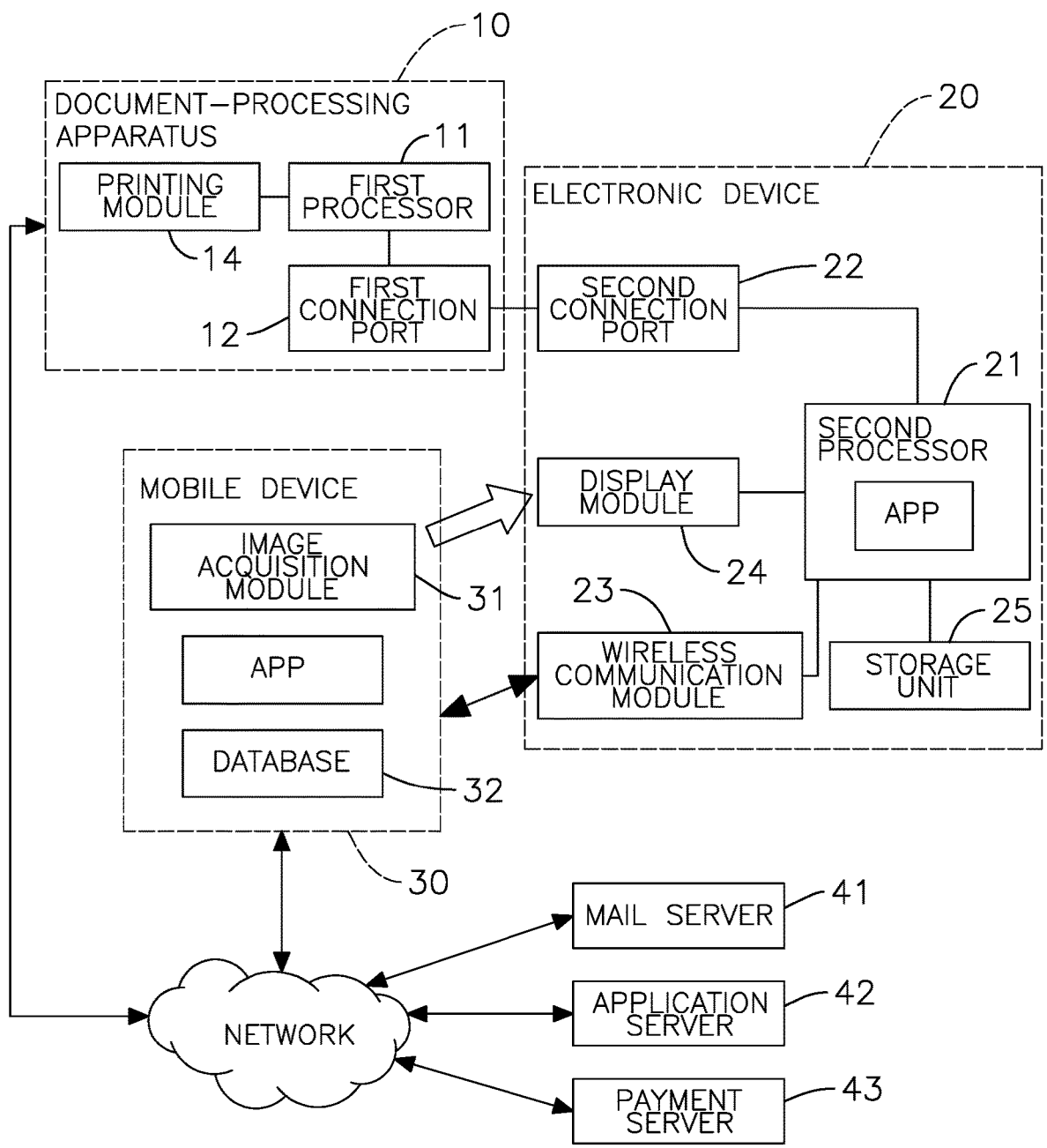
FIG. 4 is a functional block diagram showing system architecture of a second embodiment of a system using matrix barcode information to perform point-to-point information exchange in accordance with the present invention.

With reference to FIG. 4, a second embodiment of a system using matrix barcode information to perform point-to-point information exchange in accordance with the present invention differs from the foregoing embodiment in providing a printing module 14 in place of the scanning module 13 in the foregoing embodiment. The processor 11 is electrically connected to the printing module 15.

In the present embodiment when the mobile device 30 establishes the wireless link with the electronic device 20 through the matrix barcode information, the electronic device 20 stores information that is to be directly transmitted to the document-processing device 10 and the mobile device 30 by way of point-to-point communication in the data transfer zone. When the wireless communication module 23 of the electronic device 20 receives another remote command sent from the mobile device 30, the first APP in the electronic device 20 transmits another corresponding driving signal to the document-processing device 10 according to said another remote command to drive the printing module 14 to perform another corresponding automated document-processing action, which includes a document-printing procedure.

Figure 5:
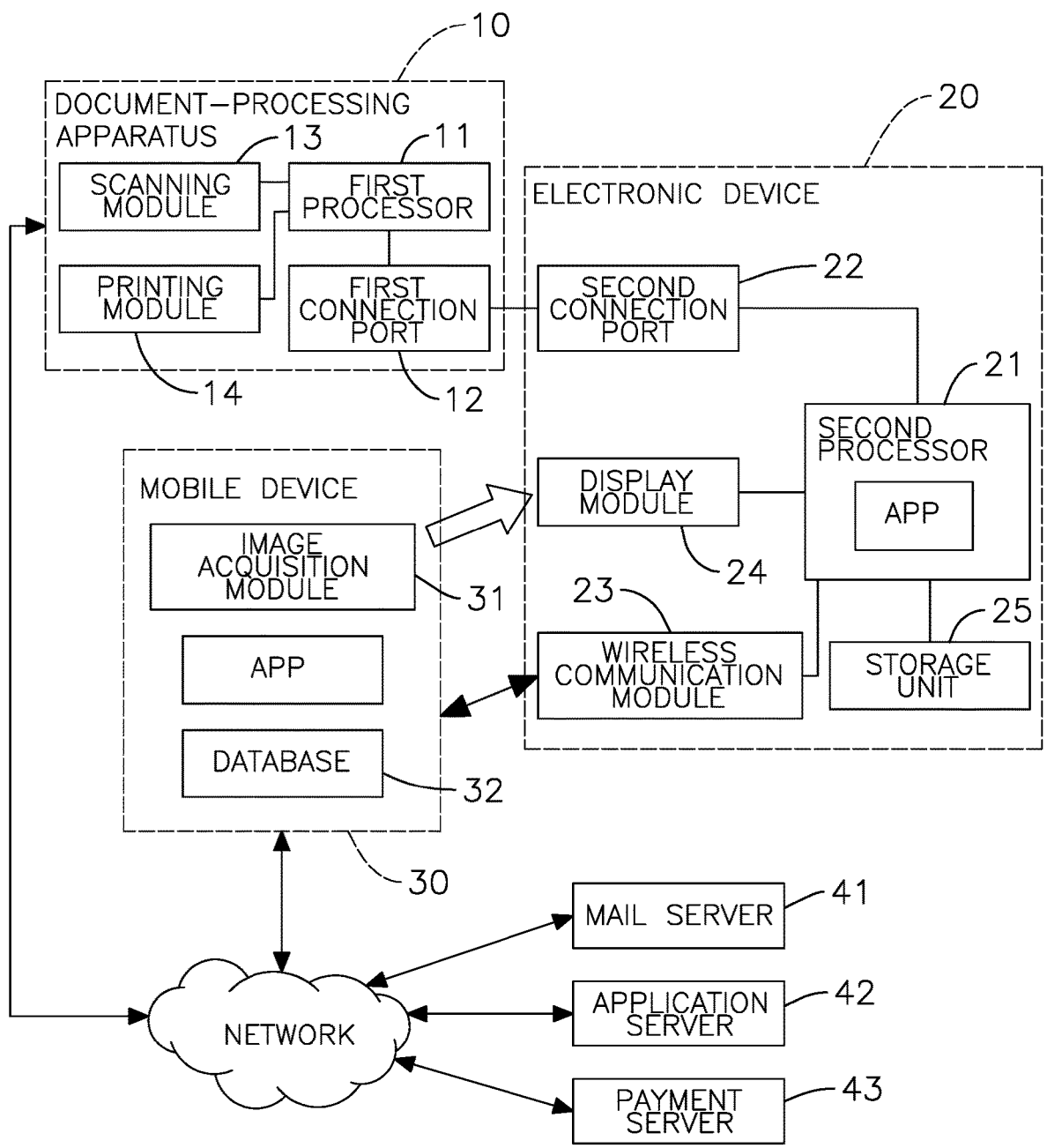
FIG. 5 is a functional block diagram showing system architecture of a third embodiment of a system using matrix barcode information to perform point-to-point information exchange in accordance with the present invention.

With reference to FIG. 5, a third embodiment of a system using matrix barcode information to perform point-to-point information exchange in accordance with the present invention differs from the foregoing embodiments in that the document-processing apparatus 10 has both the scanning module 13 and the printing module 14. The processor 11 is electrically connected to the scanning module 13 and the printing module 14 to constitute an MFP. In the present embodiment the document-processing device 10 can provide a two-way automated document-processing action, which includes the foregoing document-scanning procedure and the document-printing procedure.

The foregoing embodiments are involved with an instant point-to-point information exchange scheme that is established between the electronic device 20 and each of the document-processing device 10 and the mobile device 30 through the use of the matrix barcode information and is subject to the control of the mobile device 30 for the document-processing device 10 to perform the corresponding automated processing action and subsequent scheduled actions for assurance of efficiency and security of the document-processing system.

Figure 6:
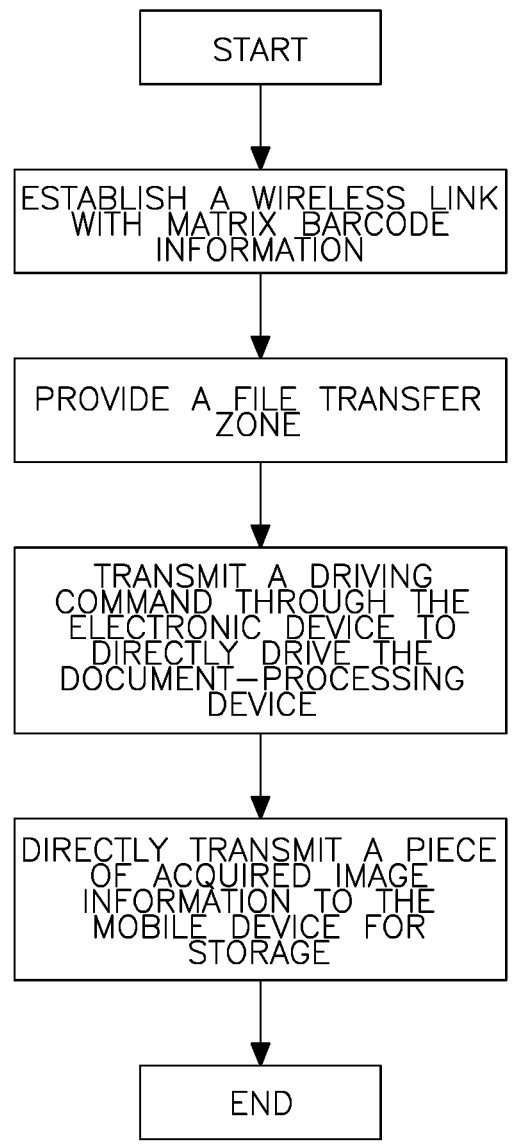
FIG. 6 is a flow diagram of a method using matrix barcode information to perform point-to-point information exchange in accordance with the present invention.

With reference to FIG. 6, a method using matrix barcode information to perform point-to-point information exchange in accordance with the present invention can be deduced from the foregoing embodiments and the actual applications thereof. The method is performed by the electronic device 20, which is connected to the document-processing device 10 by way of wired connection, with the first APP installed therein and generating the matrix barcode information, and includes the following steps.

Step S61: Provide matrix barcode information to establish a wireless link via a wireless protocol with the mobile device 30 at a proximal end. The proximal end means that when the mobile device 30 approaches the electronic device 20, the mobile device 30 can be considered at the proximal end with respect to the electronic device 20. In the present embodiment, a user can hold the mobile device 30 at the proximal end to acquire the matrix barcode information for analysis so as to acquire dedicated connection information. The mobile device 30 transmits a wireless signal to the wireless communication module 23 of the electronic device 20 to establish the wireless link with the wireless communication module 23 according to the connection information.

Step S62: Provide a file transfer zone. In the present embodiment, the file transfer zone is created through the first APP of the electronic device 20.

Step S63: Receive a remote command sent from the mobile device 30 at the proximal end and transmit a driving command corresponding to the remote command to directly drive the document-processing device 10 to perform a document-scanning procedure.

Step S64: Directly transmit a piece of image information for document acquired by performing the document-scanning procedure to the mobile device 30 at the proximal end for storage.

The matrix barcode information in the present embodiment is constituted by a quick response code (QR code). The electronic device 20 establishes the wireless link with the mobile device 30 at the proximal end through the matrix barcode information and creates the file transfer zone. When the electronic device 20 receives the remote command from the mobile device 30 at the proximal end, the document-processing device 10 performs the document-scanning procedure to acquire the piece of image information for document and then directly transmits the piece of image information for document to the mobile device 20 at the proximal end through the file transfer zone in the electronic device 20.

Figure 7:
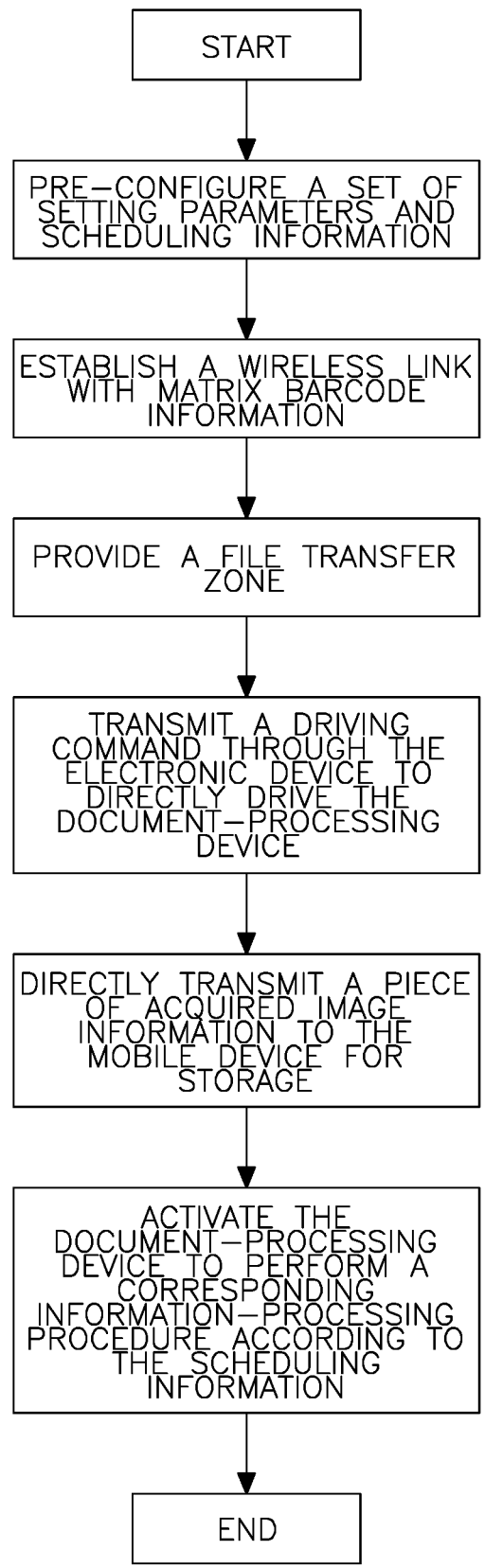
FIG. 7 is a flow diagram of another method using matrix barcode information to perform point-to-point information exchange in accordance with the present invention.

With reference to FIG. 7, prior to the step S61, the method further includes a step S60 as follows:

Step S60: Pre-configure a set of setting parameters and scheduling information in the electronic device 20 or the mobile device 30 at the proximal end.

Furthermore, after the step S64, the method further includes a step S65 as follows:

Step S65: Activate the document-processing device 10 to perform a corresponding information-processing procedure according to the pre-configured set of setting parameters and scheduling information. In the present embodiment, the information-processing procedure includes a mail-forwarding procedure, a cloud storage procedure, a classified storage procedure, or a payment procedure. By performing the information-processing procedure, convenience in operation and information management can be enhanced and the payment procedure can be simplified.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A system using matrix barcode information to perform point-to-point information exchange, comprising:
   a document-processing device having a first connection port;
   an electronic device having:
      a first application program installed in the electronic device and generating matrix barcode information; and
      a second connection port connected to the first connection port of the document-processing device; and
   a mobile device having a second application program installed in the mobile device and acquiring the matrix barcode information through the second application program to establish a wireless link with the electronic device;
   wherein when the mobile device establishes the wireless link with the electronic device, the first application program of the electronic device provides a file transfer zone to store information to be directly transmitted to the document-processing device and the mobile device in the file transfer zone, and when receiving a remote command sent from the mobile device, the electronic device transmits a driving command to the document-processing device according to the remote command to perform a corresponding automated document-processing action.

2. The system as claimed in claim 1, wherein the document-processing device includes a first processor and a scanning module, and the first processor is electrically connected to the first connection port and the scanning module;
   wherein the automated document-processing action includes a document-scanning procedure generating at least one piece of image information for document and instantly transmitting the at least one piece of image information for document to the mobile device through the wireless communication module of the electronic device.

3. The system as claimed in claim 2, wherein the electronic device includes a second processor, a wireless communication module, a display module, and a storage unit, and the second processor is electrically connected to the second connection port, the wireless communication module, the display module, and the storage unit;

wherein the first application program is installed in the second processor, displays the matrix barcode information on the display module, and creates the file transfer zone through the storage unit.

4. The system as claimed in claim 3, wherein the mobile device further includes:
a database; and
an image acquisition module acquiring the matrix barcode information and storing the at least one piece of image information for document in the database.

5. The system as claimed in claim 1, further comprising a mail server, an application server, and a payment server, wherein the document-processing device is connected to the mail server, the application server, and the payment server through a network, and performs corresponding subsequent actions according to received scheduling information.

6. The system as claimed in claim 1, wherein the document-processing device includes a first processor and a printing module, wherein the first processor is electrically connected to the first connection port and the printing module;
wherein the automated document-processing action includes a document-printing procedure.

7. The system as claimed in claim 1, wherein the document-processing device includes a first processor, a scanning module, and a printing module, and the first processor is electrically connected to the first connection port, the scanning module, and the printing module to constitute a multifunctional peripheral (MFP);
wherein the document-processing device provides a two-way automated document-processing action including a document-scanning procedure and a document-printing procedure.

8. The system as claimed in claim 1, wherein the second application program in the mobile device analyzes the matrix barcode information to acquire connection information and establishes the wireless link with the electronic device according to the connection information.

9. The system as claimed in claim 8, wherein the connection information includes account information, password information, and address information, and the mobile device establishes the wireless link with the electronic device via a wireless protocol according to the connection information.

10. The system as claimed in claim 1, wherein the matrix barcode information is constituted by a quick response code (QR code) including numbers, texts, symbols and bytes, and the QR code is used to constitute information including web address, text message, phone number, and wireless log-in account or password.

11. A method using matrix barcode information to perform point-to-point information exchange, wherein a document-processing device is connected to an electronic device, and the electronic device has a first application program installed therein and generating matrix barcode information, the method performed by the electronic device and comprising steps of:

providing matrix barcode information to establish a wireless link with a mobile device at a proximal end;
providing a file transfer zone;
receiving a remote command sent from the mobile device at the proximal end and transmitting a driving command corresponding to the remote command to directly drive the document-processing device to perform a document-scanning procedure; and
directly transmitting a piece of image information for document acquired by performing the document-scanning procedure to the mobile device at the proximal end for storage.

12. The method as claimed in claim 11, wherein prior to the step of providing matrix barcode information to establish a wireless link, the method further comprises a step of pre-configuring a set of setting parameters and scheduling information.

13. The method as claimed in claim 12, wherein after the step of directly transmitting the piece of image information for document, the method further comprises a step of activating the document-processing device to perform a corresponding information-processing procedure according to the pre-configured set of setting parameters and scheduling information.

14. The method as claimed in claim 13, wherein the information-processing procedure includes a mail-forwarding procedure transmitting the piece of image information for document to a mail server for a user to log in the mail server to retrieve the piece of image information for document.

15. The method as claimed in claim 13, wherein the information-processing procedure includes a cloud storage procedure forwarding the piece of image information for document to the application server for backup.

16. The method as claimed in claim 13, wherein the information-processing procedure includes a classified storage procedure storing the piece of image information for document in a corresponding information directory in the file transfer zone.

17. The method as claimed in claim 13, wherein the information-processing procedure includes a payment procedure issuing a payment request to the payment server to complete a payment procedure.

18. The method as claimed in claim 11, wherein the mobile device at the proximal end analyzes the matrix barcode information to acquire connection information and establishes the wireless link with the document-processing device according to the connection information.

19. The method as claimed in claim 18, wherein the connection information includes account information, password information, and address information.

20. The method as claimed in claim 11, wherein the matrix barcode information is constituted by a quick response code (QR code) including numbers, texts, symbols and bytes, and the QR code is used to constitute information including web address, text message, phone number, and wireless log-in account or password.

* * * * *